United States Patent
Kwong

(10) Patent No.: US 8,350,524 B2
(45) Date of Patent: Jan. 8, 2013

(54) CHARGING DEVICE, AND PORTABLE ELECTRONIC DEVICE EMPLOYING THE SAME, AND CHARGING SYSTEM

(75) Inventor: Pao-Lam Kwong, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 602 days.

(21) Appl. No.: 12/564,157

(22) Filed: Sep. 22, 2009

(65) Prior Publication Data

US 2010/0264872 A1    Oct. 21, 2010

(30) Foreign Application Priority Data

Apr. 16, 2009   (CN) .......................... 2009 1 0301604

(51) Int. Cl.
*H02J 7/00* (2006.01)

(52) U.S. Cl. ....................................... 320/108; 320/114

(58) Field of Classification Search .................. None
See application file for complete search history.

(56) References Cited

U.S. PATENT DOCUMENTS

| | | | | |
|---|---|---|---|---|
| 5,600,225 A | * | 2/1997 | Goto | 320/108 |
| 5,952,814 A | * | 9/1999 | Van Lerberghe | 320/108 |
| 6,792,246 B2 | * | 9/2004 | Takeda et al. | 455/41.1 |
| 2002/0159214 A1 | * | 10/2002 | Perlick et al. | 361/160 |
| 2007/0279002 A1 | * | 12/2007 | Partovi | 320/115 |

FOREIGN PATENT DOCUMENTS

| | | |
|---|---|---|
| CN | 87105323 A | 2/1988 |
| CN | 1707905 A | 12/2005 |

* cited by examiner

*Primary Examiner* — Edward Tso
*Assistant Examiner* — Robert Grant
(74) *Attorney, Agent, or Firm* — Altis Law Group, Inc.

(57) ABSTRACT

A charging device for charging a portable electronic device includes a voltage regulating unit and a charger body electrically connected to the voltage regulating unit. The voltage regulating unit is configured for receiving electric energy from an external power source and converting the external power into a stable power. The charger body receives the stable voltage and transfers the electric energy to the portable electronic device via inductive coupling to charge the portable electronic device.

15 Claims, 4 Drawing Sheets

US 8,350,524 B2

CHARGING DEVICE, AND PORTABLE ELECTRONIC DEVICE EMPLOYING THE SAME, AND CHARGING SYSTEM

BACKGROUND

1. Technical Field

The disclosure generally relates to charging devices and portable electronic devices employing the same, more particularly, to a charging device used for charging a portable electronic device, and a charging system using inductive coupling.

2. Description of Related Art

Portable electronic devices, such as mobile telephones and personal digital assistants (PDAs), generally are equipped with rechargeable batteries. To charge the battery, a separate charging device for supplying electric energy to the battery of a portable electronic device is required. Generally, separate contact terminals are respectively provided to outsides of the charging device and the portable electronic device for electrically connecting with each other.

However, the exposed contact terminal may affect the overall appearance of the portable electronic device, and may be contaminationed, such as dust and water. Additionally, if the battery is exposed to moisture due to the carelessness of a user, it may cause a short in the electrical circuits.

Therefore, there is room for improvement within the art.

BRIEF DESCRIPTION OF THE DRAWINGS

Many aspects of a charging device and a portable electronic device employing the same, and a charging system can be better understood with reference to the following drawings. The components in the drawings are not necessarily to scale, the emphasis instead being placed upon clearly illustrating the principles of the present charging device and the portable electronic employing the charging device, and the charging system. Moreover, in the drawings, like reference numerals designate corresponding parts throughout the several views.

DETAILED DESCRIPTION OF THE EMBODIMENTS

Figure 1:
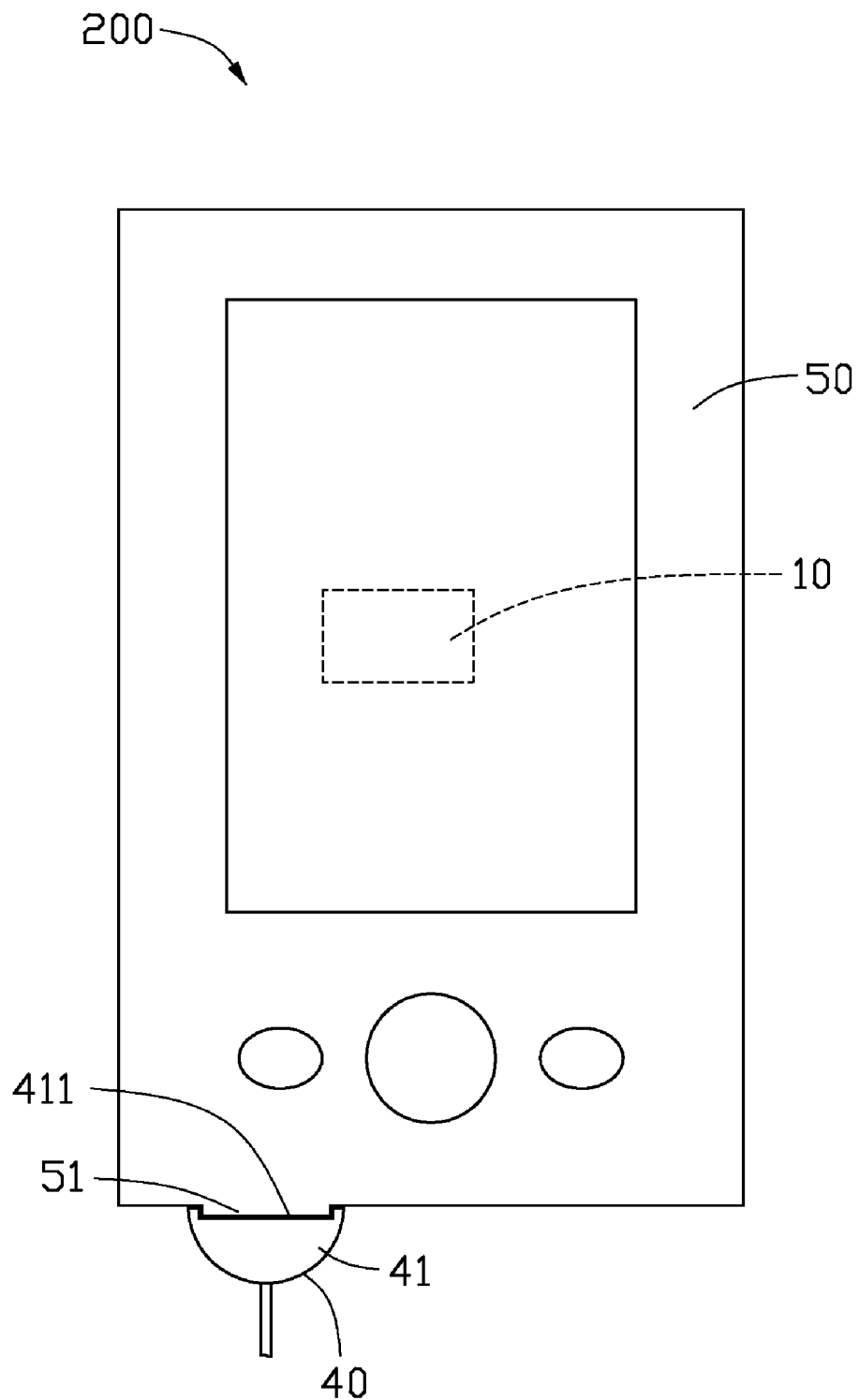
FIG. 1 is a schematic of a charger body of a charging device charging a portable electronic device, according to an exemplary embodiment.
Figure 2:
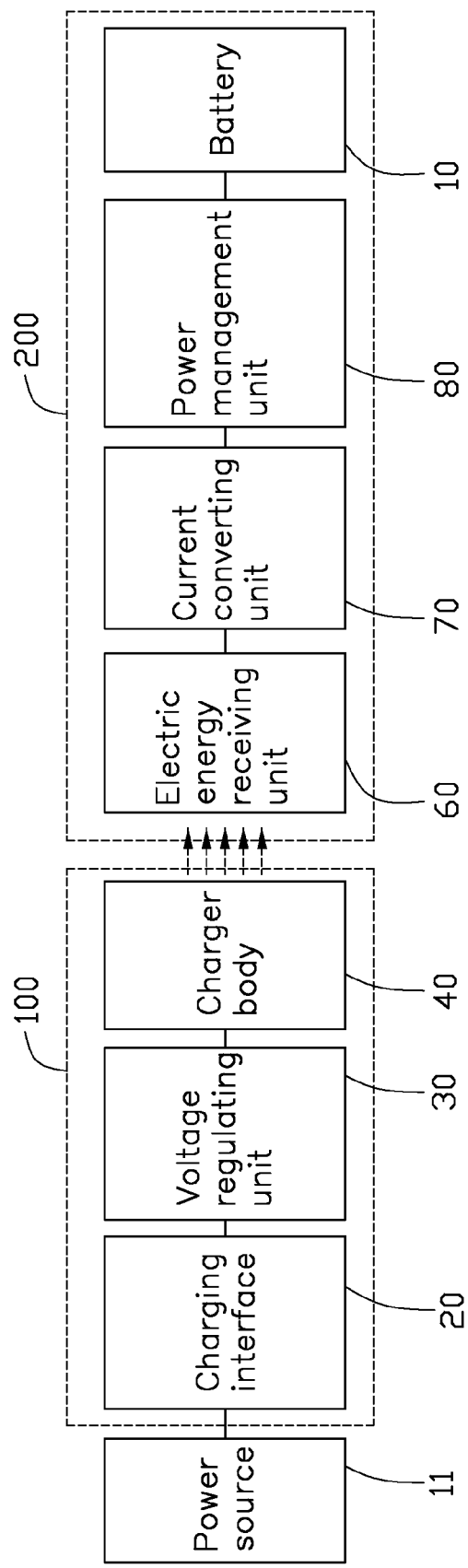
FIG. 2 is a block diagram of the portable electronic device with the charging device shown in FIG. 1.

FIGS. 1-2 show an exemplary embodiment of a charging device 100 inductively coupled with a portable electronic device 200 for charging a battery 10 of the portable electronic device 200. Preferably, the portable electronic device 200 may be a mobile phone, PDA, MP3 player etc. The charging device 100 includes a charging interface 20, a voltage regulating unit 30, and a charger body 40, which are electrically connected to each other in series.

The charging interface 20 is configured to receive electric energy from an external power source 11 and supply a charging power to the battery 10. The external power source 11 is preferably an alternating current (AC) power source for home use (e.g., 60 Hz, 220V/110V).

The voltage regulating unit 30 may use an existing AC adaptor, a transformer, etc. The voltage regulating unit 30 is configured for converting and regulating the AC power from the charging interface 20 into a stable AC power suitable for the charger body 40.

Figure 3:
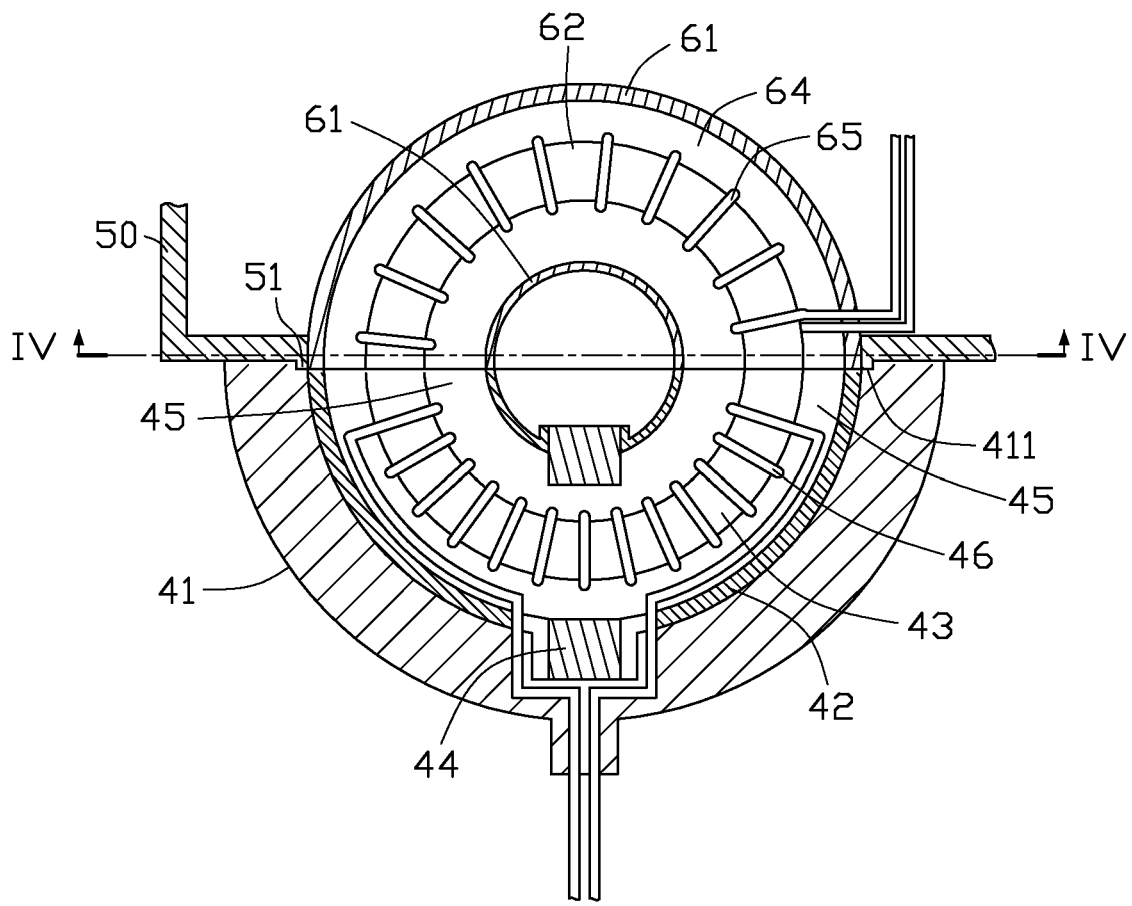
FIG. 3 is a cross-sectional schematic of the charger body of the charging device and an electric energy receiving unit of the portable electronic device shown in FIG. 1.
Figure 4:
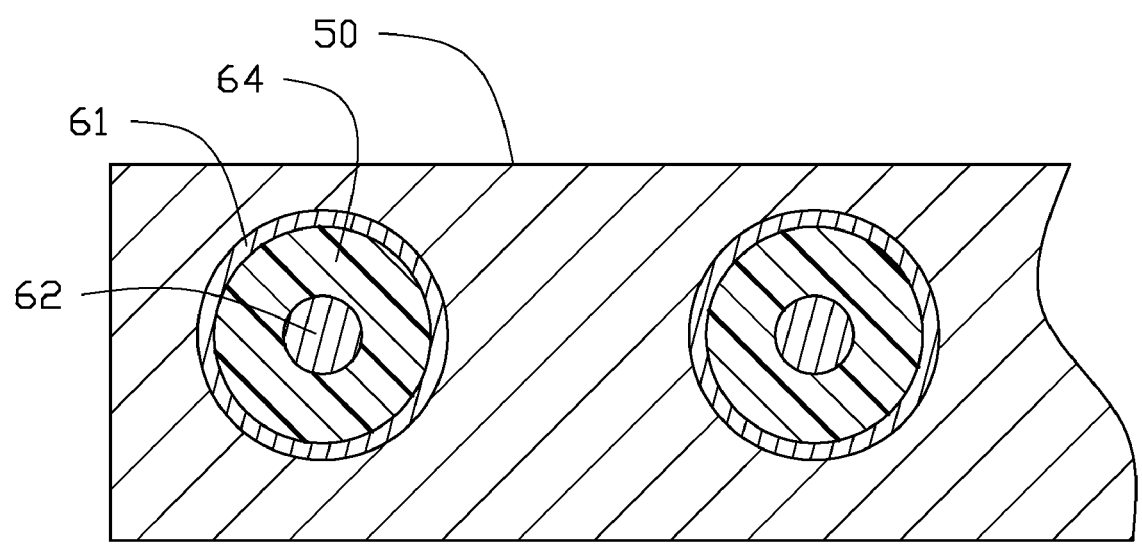
FIG. 4 is a part cross-sectional schematic view of the portable electronic device along line IV-IV shown in FIG. 3.

Further referring to FIGS. 3-4, the charger body 40 include a housing 41, a first shielding portion 42, a first magnetic core 43, a magnet 44, an insulation layer 45, and a primary coil 46. The first shielding portion 42 is mounted in the inner surface of the housing 41. The first magnetic core 43, the magnet 44 and the insulation layer 45 are located in the first shielding portion 42.

The housing 41 defines a concave section 411 therein. The first shielding portion 42 is configured for isolating electromagnetic waves when charging the battery 10 to prevent interference. When the first shielding portion 42 is magnetized, the charging device 100 can be attachable on the portable electronic device 200 via magnetic force generated by the first shielding portion 42.

The first magnet core 43 can be made from magnetoconductivity material, such as soft iron, silicon steel etc. The first magnet core 43 is mounted in the insulation layer 45 and has the generally same shape with the first shielding portion 42. The first magnet core 43 is wrapped by the primary coil 46 thereon, and an input end of the primary coil 46 is electrically connected to the voltage regulating unit 30. When the primary coil 46 receives the AC power from the voltage regulating unit 30, the primary coil 46 can generate induced current therein.

The magnet 44 may be a ring magnet, a U-shaped magnet etc. The magnet 44 in the present embodiment is a ring magnet. The magnet 44 is located at the middle part of the first shielding portion 42, so that the first shielding portion 42 is divided into two parts which are symmetrical about the magnet 44. The magnet 44 can magnetize the first shielding portion 42 respectively from a north pole and a south pole. The insulation layer 45 may be made from heat insulation material and has the general same shape with the first shielding portion 42 and the first magnetic core 43. The insulation layer 45 is mounted in the inner surface of the first shielding portion 42.

The portable electronic device 200 includes a main body 50, an electric energy receiving unit 60, a current converting unit 70, and a power management unit 80. The electric energy receiving unit 60, the current converting unit 70, the power management unit 80 and the battery 10 are mounted in the main body 50 and electrically connected to each other in series.

The main body 50 defines a convex section 51 thereof and the convex section 51 is engagable with the concave section 411 of the charging device 100, which prevent dust, moisture from entering into a charger interface between the charging device 100 and the portable electronic device 200.

The electric energy receiving unit 60 receives electric energy from the charger body 40 via inductive coupling and includes a second shielding portion 61, a second magnetic core 62, an insulation layer 64, and a secondary coil 65. The shielding portions 42 and 61 generally have the same shape and size, and the convex section 51 engages with the concave section 411. The shielding portions 42 and 61 may be made from iron, magnet, etc. The convex section 51 can secure in the concave section 411 via magnetic force between the first shielding portion 42 and the second shielding portion 61, so that the charging device 100 can be attached on the portable electronic device 200.

The second magnetic core 62 may be made from magnetoconductivity material, such as soft iron, silicon steel etc, and is located in the second shielding portion 61. The magnetic cores 43 and 62 generally have the same shape and size. The second magnetic core 62 is wrapped by the secondary coil 65 thereon, and an output end of the secondary coil 62 is electrically connected to the current converting unit 70.

When the convex section 51 engages with the concave section 411, the first magnetic core 43 is adjacent with the second magnetic core 62, so that the magnetic cores 43 and 62 form an annular magnetic core. The primary coil 46 and the secondary coil 65 can achieve a high level magnetic coupling due to the magneto-conductivity of the magnetic cores 43 and 62. The primary coil 46 and the secondary coil 65 are electromagnetically inductively coupled with each other. Thus, a magnetic field generated by the coils 46 and 65 induces current in the secondary coil 65.

Considering the heat losses of the coils 46 and 65 and hysteresis losses of the magnetic cores 43 and 62, the coil ratio of the coils 46 and 65 may be better set to about 5:4, which can compensate for energy loss and still generate suitable voltages for charging the battery 10. Moreover, the primary coil 46 and the secondary coil 62 are respectively located inside the first shielding portion 42 and the second shielding portion 61, which can isolate electromagnetic waves to reduce electromagnetic radiation release.

The current converting unit 70 may use an existing AC/DC convertor, which is configured for converting the induced current from the secondary coil 65 into DC voltage and output a constant voltage and a constant current to the battery 10. The power management unit 80 may use an existing power management chip, which is configured for processing the constant voltage and the constant current to prevent an overvoltage or an overcurrent from being applied to the battery 10.

In use, the convex section 51 of the portable electronic device 200 is inserted into the concave section 411 of the charging device 100, and the charging device 100 is attached on the portable electronic device 200 via the magnetic force between the first shielding portion 42 and the second shielding portion 61. The charging interface 20 receives AC power from the external power source 11. The voltage regulating unit 30 converts and regulates the AC power into a stable AC power suitable for operating the charger body 40. The primary coil 46 and the secondary coil 65 are electromagnetically inductively coupled with each other, and the secondary coil 65 generates an induced current. Then, the current converting unit 70 converts the induced current from the secondary coil 65 into DC voltage and outputs a constant DC voltage and a constant DC current. The power management unit 80 processes the constant voltage and the constant current to preventing an overvoltage or an overcurrent from being applied to the battery 10. Therefore, the charging device 100 can charge the portable electronic device 200 via inductive coupling.

It is to be understood, however, when the battery 10 is fully charged, the power management unit 80 stops charging the battery 10.

As described above, both the charging device 100 and the portable electronic device 200 can omit the contact terminal, which can prevent external impurities from contaminating inner circuits of the charging device 100 and the portable electronic device 200.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A charging device for charging a portable electronic device, comprising:
    a voltage regulating unit configured for converting an external voltage into a stable voltage; and
    a charger body electrically connected to the voltage regulating unit, wherein the charger body comprises a first shielding portion and a magnet located in the first shielding portion to divide the first shielding portion into two parts, the magnet magnetizes the first shielding portion, and the charging device is attached to the portable electronic device via magnetic force generated by the first shielding portion; the charger body receives the stable voltage and charges the portable electronic device via inductive coupling.

2. The charging device as claimed in claim 1, wherein the charger body comprises a first magnetic core and a primary coil wrapped on the first magnetic core, the primary coil electrically connected to the voltage regulating unit, and the first magnetic core is made from magneto-conductivity material.

3. The charging device as claimed in claim 2, wherein the first shielding portion is configured for isolating electromagnetic waves when charging the battery to prevent interference, the first magnetic core is located in the first shielding portion, and the magnet is located at the middle part of the first shielding portion to divide the first shielding portion into two symmetrical parts about the magnet.

4. The charging device as claimed in claim 3, wherein the charger body further comprises an insulation layer located between the first magnetic core and the first shielding portion, and the insulation layer is made from heat insulation material and has the same shape with the first shielding portion and the first magnetic core.

5. The charging device as claimed in claim 1, wherein the charger body further comprises a housing, the first shielding portion, the first magnetic core, the insulation layer, the primary coil are located inside the housing, the housing defines a concave section therein, the concave section is used to accommodate one part of the portable electronic device.

6. A charging system, comprising:
    a charging device comprising:
        a charger body configured for generating an induced current, comprising:
            a first shielding portion: and
            a magnet located in the first shielding portion, wherein the magnet divides the first shielding portion into two parts and magnetizes the two parts of the first shielding portion: and
    a portable electronic device comprising:
        an electric energy receiving unit configured for receiving electric energy from the charger body via inductive coupling and inducing an induced current to charge a battery, and the charging device being attached to the portable electronic device via magnetic force generated by the first shielding portion.

7. The charging system as claimed in claim 6, wherein the charging device further comprises a voltage regulating unit for receiving electric energy from an external power source and converting the external power into a the stable voltage.

8. The charging system as claimed in claim 1, wherein the charger body further comprises a first magnetic core and a primary coil wrapped on the first magnetic core and electrically connected to the voltage regulating unit, the primary coil is configured for receiving the electric energy from the voltage regulating unit and generating the induced current, and the first magnetic core is made from magneto-conductivity material.

9. The charging system as claimed in claim 8, wherein the first shielding portion is configured for insolating electromagnetic waves when charging the battery to prevent interference and an insulation layer mounted in the first shielding portion, the first magnetic core is located in the first shielding portion, the magnet is located at the middle pan of the first shielding portion to divide the first shielding portion into two symmetrical parts about the magnet, and the insulation layer is made from heat insulation material and has the same shape with the first shielding portion and the first magnetic core.

10. The charging system as claimed in claim 7, wherein the electric energy receiving unit comprises a secondary coil electrically connected to the current converting unit and a second magnetic core wrapped by the secondary coil, the primary coil is coupled with the secondary coil due to inductive coupling to induce the induced current in the secondary coil.

11. The charging system as claimed in claim 10, wherein the electric energy receiving unit further comprises a second shielding portion for insolating electromagnetic waves and an insulation layer located between the second magnetic core and the second shielding portion, the second magnetic core is located in the second shielding portion.

12. The charging system as claimed in claim 9; wherein the charger body further comprise a housing, the first shielding portion, the first magnetic core, the insulation layer, and the primary coil are located inside the housing, the housing defines a concave section therein.

13. The charging system as claimed in claim 12, wherein the main body defines a convex section thereon, the convex section is formed at one end of the main body, the convex section is use to engage with the concave section to secure the charging device.

14. The charging system as claimed in claim 6, wherein the portable electronic device further comprises a current converting unit electrically connected to the electric energy receiving unit, the current convening unit is configured for converting the induced current into DC, a constant voltage and a constant current.

15. The charging system as claimed in claim 14, wherein the portable electronic device further comprises a power management unit electrically connected to the current converting unit, the power management unit is configured for processing the constant voltage and the constant current to charge the battery.

* * * * *